(12) United States Patent
Meyrahn et al.

(10) Patent No.: US 7,954,231 B2
(45) Date of Patent: Jun. 7, 2011

(54) CLIP MACHINE AND METHOD FOR ADJUSTING A CLIP MACHINE

(75) Inventors: Joachim Meyrahn, Erzhausen (DE); Detlef Ebert, Bad Nauheim (DE)

(73) Assignee: Poly-clip System GmbH & Co. KG (DE)

( * ) Notice: Subject to any disclaimer, the term of this patent is extended or adjusted under 35 U.S.C. 154(b) by 916 days.

(21) Appl. No.: 11/419,349

(22) Filed: May 19, 2006

(65) Prior Publication Data
US 2006/0272374 A1 Dec. 7, 2006

(30) Foreign Application Priority Data
Jun. 7, 2005 (DE) .......................... 10 2005 026 219

(51) Int. Cl.
*B23Q 17/00* (2006.01)
(52) U.S. Cl. .................... 29/715; 29/407.08; 29/407.09; 29/709; 29/407.05; 29/798
(58) Field of Classification Search ............... 29/407.05, 29/407.08, 407.9, 243.56, 701–703, 709, 29/715, 718, 720, 798, 753, 755
See application file for complete search history.

(56) References Cited

U.S. PATENT DOCUMENTS

| | | | | |
|---|---|---|---|---|
| 5,117,612 A * | 6/1992 | Keim et al. | | 53/451 |
| 6,101,785 A | 8/2000 | Bienert et al. | | |
| 6,298,635 B1 * | 10/2001 | Bienert et al. | | 53/417 |
| 6,457,338 B1 * | 10/2002 | Frenken | | 72/20.1 |
| 7,032,296 B2 * | 4/2006 | Zdravkovic et al. | | 29/709 |
| 7,123,982 B2 * | 10/2006 | Mauer et al. | | 700/175 |
| 7,305,755 B2 * | 12/2007 | Schmidt | | 29/715 |
| 7,409,760 B2 * | 8/2008 | Mauer et al. | | 29/715 |
| 7,559,133 B2 * | 7/2009 | Chitty et al. | | 29/716 |
| 7,673,377 B2 * | 3/2010 | Clew | | 29/407.1 |
| 7,810,231 B2 * | 10/2010 | Naitoh | | 29/798 |
| 2002/0029450 A1 * | 3/2002 | Kondo | | 29/407.01 |
| 2008/0178454 A1 * | 7/2008 | Morris et al. | | 29/432.2 |

FOREIGN PATENT DOCUMENTS

| | | |
|---|---|---|
| DE | 1 933 066 U | 2/1966 |
| EP | 0 467 020 A1 | 1/1992 |
| EP | 0 268 206 B1 | 2/1992 |
| EP | 0 900 733 A1 | 3/1999 |
| GB | 1179624 | 1/1970 |

OTHER PUBLICATIONS

EP 06 00 8708 Search Report.

* cited by examiner

*Primary Examiner* — David P Bryant
*Assistant Examiner* — Bayan Salone
(74) *Attorney, Agent, or Firm* — Hahn Loeser & Parks LLP

(57) ABSTRACT

The invention relates to a clip machine comprising two closing tools that are movable relative to each other between an open position and a closed position in order to close clips, and further comprising adjusting means designed to set the neutral position of a closing tool and hence the gap between the closing tools, in particular in their closed position (closure gap). The clip machine includes a measuring device configured to measure a closing force applied when closing a clip, or a parameter proportional to said closing force, and to output a measured value representing the closing force or the parameter proportional thereto. The invention also relates to a method for adjusting such a clip machine.

9 Claims, 3 Drawing Sheets

CLIP MACHINE AND METHOD FOR ADJUSTING A CLIP MACHINE

This patent application claims priority to German patent application DE 10 2005 026 219.8-27, filed Jun. 7, 2005, hereby incorporated by reference.

TECHNICAL FIELD

The invention relates to a clip machine comprising two closing tools that are movable relative to each other between an open position and a closed position in order to close sealing elements (clips), and further comprising adjusting means designed to set the neutral position of a closing tool and hence the gap between the closing tools, in particular in their closed position (closure gap). The invention also relates to a method for adjusting such a clip machine.

BACKGROUND OF THE INVENTION

Clip machines of the kind referred to are typically used to close bags or tubular packaging (tubular casing or gut) filled with a liquid to thick pasty material or (in some cases) granular material. During such an operation, the filling is first introduced into the packaging and in the case of tubular packaging is subsequently divided into portions by means of displacement elements. Said displacement elements gather and tie the tubular casing in the radial direction and displace the filling in the constriction in the axial direction with respect to the axis of the tube. In the area where the casing is gathered and tied, a braid of casing material is formed. In the next operating cycle, one, or in the case of a double clip arrangement two clips are applied to the braided casing by means of two (or four) closing tools moved against each other. Each pair of closing tools comprises a punch and a die-plate, between which the clip is shaped during closure until the closed position is reached (the reversal point of movement). Once the packaging has been clipped, the closing tools are returned to their initial or open position.

Such a seal must meet high quality standards. On the one hand, it must not be so firm that the casing is damaged during closure. On the other hand, however, the clipped seal must be sufficiently tight to ensure that it does not slip off when the sealed sausage is subsequently processed (cooked, smoked, etc.), for example.

When the clip machine is used for many different sausage products and casings, different clips are applied that differ in respect of both strength and size (leg length and thickness of material). The closure gap must be adjusted accordingly, because this is the critical size—referred to hereinafter as the clip height—to which the clip is pressed together during closure. In the prior art, this is achieved by changing the neutral position of at least one of the closing tools. This is done empirically at first. However, the necessary precision is frequently not achieved. The users of such clip machines generally check the firmness of closure manually, and therefore very subjectively. Very often, the clip height is kept below the required height to ensure that the clip is firmly attached to the casing. As a result however, the clip machine may be subjected to much greater stresses and strains that would actually be necessary, and this can lead to greater wear and tear or even to the machine being damaged. There is also a risk that the casing is sometimes damaged during clipping, and that the filling can escape or be spoiled.

If the machine has nevertheless been adjusted in this way for a particular type of product and/or clip size, the specific clip height will be reproduced in future on the basis of a scale mounted on the clip machine. A clip machine of this kind, in the form of a benchtop machine, is known from DE-U-1933066. However, further incorrect adjustment of the machine can easily occur, especially when reproducing the setting, leading to insufficient firmness of closure occurring again and again, as well as greater wear and tear and damage to the clip machine.

Since the closing tools are moved together with closing forces in excess of several thousand Newtons (up to 15 kN) when closing a clip, a certain amount of wear and tear can be expected in all moving parts. The resultant play is not taken into account when setting the closure gap with the aid of the scale on the clip machine. In addition to the risk of incorrect adjustment of the machine, this can also result in the scale value no longer matching the actual closure gap and hence also in the actually ensuing clip height no longer corresponding to the empirically measured tightness of closure.

The users of such clip machines are thus compelled to check the tightness of closure at regular intervals, and to correct it when necessary.

A pressure limitation apparatus for such a clip machine, aimed at counteracting this nuisance, is known from EP 0 476 020 A1. In the latter, the force on the punch is reduced by means of a plunger arrangement and a pressure reservoir when a preset closing force on the punch is exceeded. Although this provides a reduced risk of the clip machine and the sausage casing being damaged, it cannot ensure that the clip is closed to a sufficient clip height.

A clip machine which includes a distance sensor for measuring the closure gap by means of a distance sensor and reference surface positioned stationary with respect to the closing tools is known from EP 0 990 733 A1. This enables a parameter that actually does correspond to the height of the closure clip to be measured. However, even this monitoring device does not exclude incorrect adjustment of the machine. For example, if an incorrect closure gap is selected for a particular clip, or if a clip from a previous closure operation is left between the closure tools due to a malfunction, measuring the closure gap of the closure tools cannot prevent the risk of a malfunction of, or even damage to the clip machine or the product or casing being closed.

SUMMARY OF THE INVENTION

The object of the present invention is therefore to provide an improved clip machine and a method for adjusting said clip machine such that the risk of incorrect adjustment and/or malfunction is reduced, and hence that the process of closing a clip around the casing is made more reliable.

This object is achieved according to the invention by a clip machine of the kind initially specified having the features defined in the characterising portion of claim 1, and by means of a method having the features defined in claim 11.

The invention is based on the realization that none of the prior art clip machines allows a definitive conclusion to be drawn regarding the closing force actually applied and hence about the strength of closure. With prior-art clip machines, it is not possible to obtain feedback regarding the correctness of the closure gap which has been set. The clip machine according to the invention therefore includes a measuring device with which either the closing force applied during clip closure or a parameter proportional to said closing force can be measured directly. On the basis of the respective value measured, feedback can then be provided that enables the necessary precision to be achieved when setting the closure gap.

This is achieved with an advantageous development of the clip machine in which an event data memory and a controller are configured to compare the measured value with a first selected value range and to record the event in said event data memory if the measured value leaves said first selected value range. It is possible by this means to read out deviations in the closing force during operation, or later from the memory, and hence to draw conclusions about incorrect operator control, such as incorrectly set clip heights, or about equipment malfunction. Among other things, this also enables the manufacturer of the clip machine to identify quickly the causes of operational failure or of a defect in the machine.

It is particularly preferred that the clip machine be alternatively or additionally equipped with a servodrive coupled to the adjusting means, the controller being configured to compare the measured value with a second selected value range and to output a control signal for setting the neutral position at the servodrive if the measured value leaves the second selected value range. This provides feedback that ensures automatic readjustment of the closure gap in the event that this was initially set incorrectly or becomes maladjusted during production.

In another advantageous embodiment of the clip machine according to the invention, the controller is alternatively or additionally configured to compare the measured value with a third selected value range and to stop the clip machine if the measured value leaves said third selected value range. This development of the invention is of great benefit particularly when a clip is left between the closing tools, for example because of a malfunction in production, and clips become jammed as a result between the closing tools. Stopping the machine—with a warning signal indicating the cause of the malfunction, if necessary—can then help to eliminate the cause, i.e. the jammed clips.

Recording of events, adjustment of the closing tools and/or stopping of the machine can be performed when the threshold values defining the selected value range are exceeded or not reached on one occasion, for example, or when the relevant value range is left repeatedly in succession, or when the relevant value range is repeatedly left over a predetermined period.

In one particularly preferred development of the invention, the clip machine has a position sensor coupled to the adjustable closing tool (110) and configured to generate and output a value for the neutral position representative of the neutral position of the adjusted closing tool. In addition to the closing force actually applied, it is also possible by this means to monitor the closure gap that has actually been set. This has the advantage that, after every change of clip type in use, for example, a known value for the neutral position can be adopted and the neutral position of the closing tool corresponding to this value can be reproduced. This is an improvement compared to the prior-art distance sensor, in that reproducing the setting is not done by changing the closure gap of the closing tools in relative terms, but rather in absolute terms and also in the open position.

A display device is preferably provided that is configured to display the event if the value measured leaves the first and/or second and/or third selected value range. By this means, the operating personnel is given an opportunity to counteract immediately any acute or imminent malfunction. The display device can display the event both acoustically and visually, or as a combination of both.

It is particularly preferred that the measuring device comprise a spring coupled to one of the closing tools, said spring acting against the closing force during clip closure, and a position measuring device, coupled to the closing tool, for measuring the deflection of the spring during clip closure. In this case, it is particularly preferred that the position measuring device be formed by the position sensor coupled to the adjustable closing tool in order to generate and output the value for the neutral position, said position sensor also being configured to generate and output a deflection value representing the deflection of the spring during clip closure. In this way, the position sensor and the device for measuring the closing force can be easily combined by using the same position sensor for statically determining the neutral position of a closing tool and hence the closed position, on the one hand, and, on the other hand, for dynamically measuring the deflection of the spring during clip closure, and hence the closing force or the parameter proportional to it. The closing force can be measured using the maximum measured deflection of the spring, or by differential measurement of the path travelled. Over an approximately linear range of the spring constant, the deflection can be measured directly from the deflection, or more precisely by taking the spring curve into account.

BRIEF DESCRIPTION OF THE DRAWINGS

Other features and advantages of the clip machine according to the invention are derived from the subclaims. These shall now be explained in the following description of an embodiment of the invention, with reference to the enclosed Figures, in which:

DETAILED DESCRIPTION OF THE DRAWINGS

Figure 1:
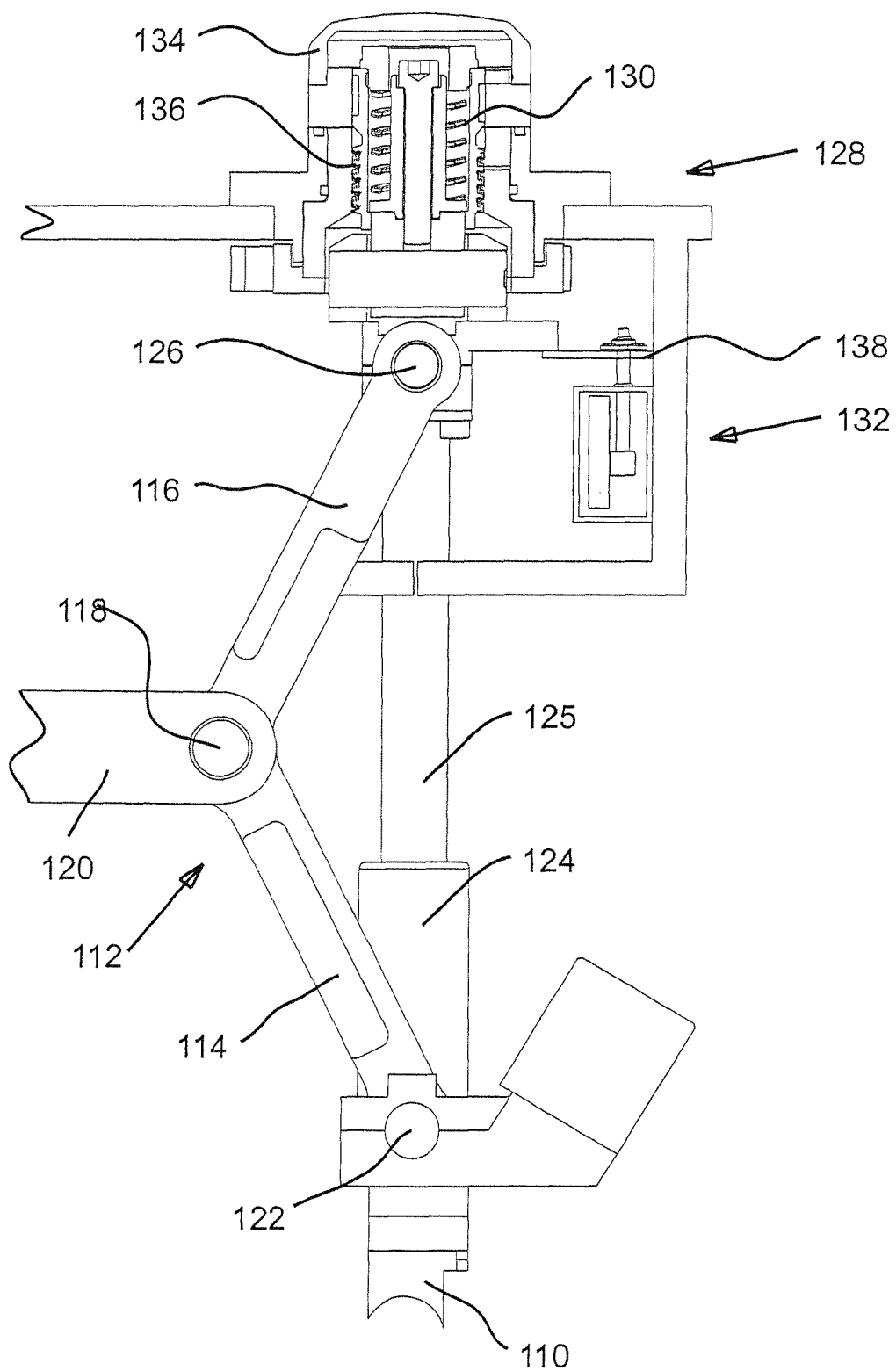
FIG. 1 shows a section of an embodiment of the clip machine according to the invention.

The section in FIG. 1 shows a first of two closing tools in an embodiment of the clip machine 100 according to the invention, in this case a punch 110. Punch 110 is driven by a toggle joint mechanism 112. Said toggle joint mechanism 112 comprises a first lever 114 and a second lever 116 which together form a toggle joint 118. At the end remote from toggle joint 118, lever 114 is pivotably mounted to a pivot pin 122 which is fixedly attached to punch 110. At the end opposite toggle joint 118, second lever 116 is pivotably mounted to a counter-bearing 126. When toggle joint 118 is flexed or straightened by a force applied via a coupling rod 120, the punch moves up and down between an upper open position and a lower closed position. Punch 110 mounted on a punch support 124 is guided in telescope fashion by a cylinder guide 125 fixedly attached to the machine housing (not shown).

In the closed position, the punch is brought to within a minimum closure gap of the second closing tool (a die-plate, not shown). When the toggle joint mechanism 112 is straightened, thus causing the punch to be moved to the closed position, the force applied to shape and close a clip is therefore transmitted via counter-bearing 126.

Counter-bearing 126, for its part, is fixedly attached to the measuring device 128 of the invention, the purpose of which is to measure the closing force applied during clip closure. Thus, measuring device 128 is fixedly attached to punch 110 via counter-bearing 126 and toggle joint mechanism 112. Measuring device 128, for its part, includes a spring 130 and a position sensor 132, each of which are coupled in this manner to punch 110. Spring 130 is a pressure spring supported at the end opposite counter-bearing 126 against a housing 134 that is fixedly mounted on the machine housing (not shown) of clip machine 100.

In the embodiment shown, the closing force applied when closing a clip is transmitted to housing 134 via toggle joint mechanism 112, counter-bearing 126 and spring 130 to housing 134. Spring 130 is compressed by an amount that depends on the closing force. Said spring deflection can—under specific conditions—be linearly proportional to the closing force and/or nonlinearly dependent on said closing force. However, in the range in which the spring deflection is no longer proportional to the closing force applied, the outputted measured value can be corrected by means of a spring curve.

Depending on the spring deflection, a reference plate 138 likewise attached fixedly to counter-bearing 126 distances itself from an associated gap detector of a position sensor 132 comprised of said two elements (reference plate and gap detector), because the gap detector for its part is fixedly connected via cylinder guide 125 to the machine housing of the clip machine. Thus, by measuring the varying gap between reference plate 138 and the gap detector resulting from compression of spring 130, position sensor 132 is able to determine the spring deflection during closure of a clip. Of course, the allocation of the gap detector and reference plate to the stationary machine parts and to the movable parts coupled to the closing tool can also be reversed.

Position sensor 132, for example, can be provided in the form of a magnetic scanning system in which a magnetic gauge associated with the reference plate is read by a magnetic sensor. It is also possible to use position sensors based on an optical scanning system in which a gauge is read optically, or on an opto-interferometric measuring system, or on an acoustic measuring system.

However, position sensor 132 serves not only to determine the spring deflection but simultaneously to determine the neutral position of the closing tool (in the case of this punch). This can be adjusted by adjusting means, specifically in this case by means of a spindle adjuster 136. Said spindle adjuster 136 connects spring housing 134 to counter-bearing 126 and enables by rotation an axial adjustment of counter-bearing 126, hence also of punch 110 in its neutral position relative to spring housing 134 and the machine housing. In this way, it is possible to adjust the closed position when toggle joint mechanism 112 is straightened, and hence the closure gap between the closing tools. Adjustment of counter-bearing 126 serves simultaneously to alter the gap between distance sensor 132 and reference plate 138, thus enabling the (neutral) position to be determined in absolute terms.

Alternatively, the adjusting means can be provided at either the counter-bearing or the closing tool, for example in a similar toggle joint mechanism in which the coupling points of the toggle lever are variable (e.g. slidable or eccentrically displaceable). It would also be conceivable to configure the levers of the toggle joint mechanism so that they are adjustable in length. All these principles can also be transferred without difficulty to clip machines which do without a (toggle) lever mechanism for applying the closing force.

The neutral position and hence the closure gap can be adjusted either manually or by means of a motor. The advantage of motoric adjustment by means of a servodrive (not shown) is that the measured value representative of the closing force and detected by measuring device 128 can be used in a control loop for automatically setting or readjusting the neutral position and hence the closure gap.

Integrating the closing force measuring device in position sensor 132 saves both costs and space. In addition, monitoring the neutral position by means of position sensor 132 enables a plausibility test to be carried out, before the first clip is closed, on the preset value representing the neutral position of the adjusted closing tool, for example when a setpoint or preset range is defined for that value in a product database for a specifically selected product. This testing of plausibility by comparing the actually detected value for the neutral position with the setpoint can then be displayed or can serve as feedback for the servodrive. This static monitoring of position supplements the dynamic monitoring of closing force according to the invention. For example, an additional comparison can be made to select the first and/or second and/or third value range for the measured value of the closing force, depending on the preset value for the neutral position or the measured value for the neutral position.

Since the closing force is measured both dynamically and in real time during the closure operation, the closing force can be precisely determined during each closure operation, and any irregularities can be responded to immediately. The product database can firstly define a preset range for the maximum spring deflection, which is compared with the spring deflection as actually measured. The result can then be displayed, and the desired closing force and hence a constant clip height can be set by readjusting the neutral position either manually or automatically.

Measuring device 128 for measuring the closing force also allows fault diagnosis to be carried out easily. For example, any breakage of the spring 130 coupled to closing tool 110 can be detected instantly. In the event of the spring breaking, punch 110 is no longer braced via the toggle joint mechanism over a particular distance corresponding to the spring fracture, which thus results in a significantly greater deflection of position sensor 132 than would otherwise be the case if the spring were intact.

Figure 2:
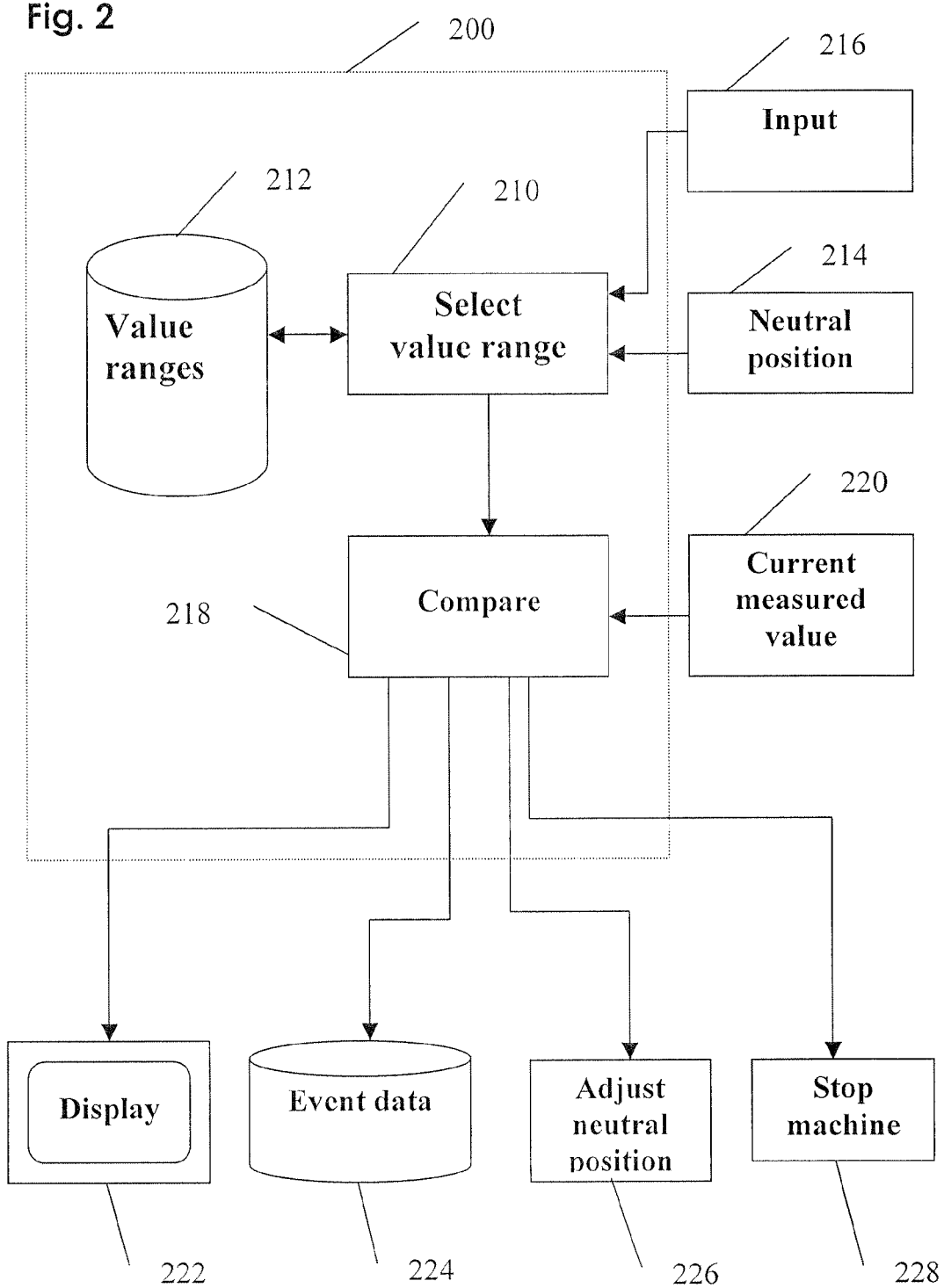
FIG. 2 shows a schematic view of the controller for an embodiment of the clip machine according to the invention.

The schematic view in FIG. 2 shows an example of a controller 200 for the clip machine according to the invention, said controller having a selector 210 for the value range and a database 212 for the value range. One or more ranges are selected from the database according to the value for the neutral position as outputted by position sensor 214, and/or on the basis of product information which has been read in. Said product information can be directly and manually inputted using an input unit 216 before production begins, for example. Alternatively, the product information can also be read in automatically from a product information database (not shown).

Once selector 210 has chosen one or more value ranges, said one or more value ranges are compared by means of a comparator unit 218 of controller 200 with the measured value outputted by measuring device 220, the latter value representing the closing force applied during clip closure, or a parameter proportional to said force. Comparator unit 218 then outputs a command to a display device 222 to display the event, and/or to an event data memory 224 to record the event, and/or to a servodrive 226 to set or readjust the neutral position, and/or to a main controller of the machine 228 to stop the clip machine. The decision as to which of the components 222, 224, 226 and 228 the command is given to is made by comparator unit 218 based on its comparison of the measured value obtained by measuring device 220 with several value ranges, as shall be explained in an example with reference to FIG. 3. The value ranges typically differ, but they can also be wholly or partially congruent.

Display device 222 indicates the event. Preferably, this can be done visually, but it can also be done acoustically. It is advantageous if a display or monitor screen is used in combination with an acoustic warning signal.

An embodiment of the method according to the invention for adjusting a clip machine shall now be described with reference to FIG. 3.

Initialization of the clip machine, including the adjustment method according to the invention, inter alia, begins at each commencement of production S300. A product selection S304 is performed simultaneously with initialization. The adjustment method begins by determining the neutral position S302 by means of the position sensor coupled to the adjustable closing tool, said sensor generating and outputting a neutral position value representing the adjusted closing tool or tools. In a consecutive step S306 of the method, a test is performed to determine, on the basis of said product selection, whether the set value for the neutral position matches the selected product. If this is not the case, the neutral position is adjusted in step S308 of the method. This adjustment can be made either manually, for example by an operator who manually turns a spindle adjuster and reads the actual position or the deviation from the setpoint position on a display. Alternatively, a stepper motor drive is actuated to make the adjustment corresponding to the difference between the actual and the setpoint position. An additional alternative allows any motor drive to be controlled by means of the almost constantly sensed value of the neutral position such that it moves the closing tool into the desired setpoint position for the selected product.

Once the desired value for the neutral position has been reached, the closing force is measured in step S310 for the first (and each successive) closure operation. The closing force measured is compared with a value range previously selected in step S312, said value range being determined on the basis of the product selection made in step S304. If the comparison indicates that the measured closing force is outside the selected value range 3, the clip machine is stopped in step S316 and the event is recorded and/or displayed in step 318.

If the measured closing force is within the selected value range 3, the closing force is compared in a next step S320 with a second selected value range. If the comparison indicates that the closing force is outside the selected value range 2, the clip machine is stopped in step S316 and the event is recorded and/or displayed in step 318.

If the test in step S320 indicates that the measured closing force is also within the selected value range 2, it is then verified in a next step S326 whether the measured closing force is within a first selected value range. If this is not the case, the event is recorded and/or displayed in step S328.

In each of steps S318, S324 and S328, the event log can include information about the selected product, the neutral position as adjusted or preset, the selected value range for the closing force, the measured closing force, and the action taken.

In contrast, if the test in step S326 indicates that the measured closing force is also within the selected value range 1, a query is made in the next step S330 to determine whether production has ended and/or whether a manual command to stop the machine has been given in the meantime. The same step S330 query as to whether production has ended or a command to stop production has been given is also made after step S322, in which the neutral position is adjusted when the measured closing force is outside the selected value range 2. If the test is affirmative, the machine is stopped in step S332. Otherwise, in step 310, the next closure cycle is initiated.

Figure 3:
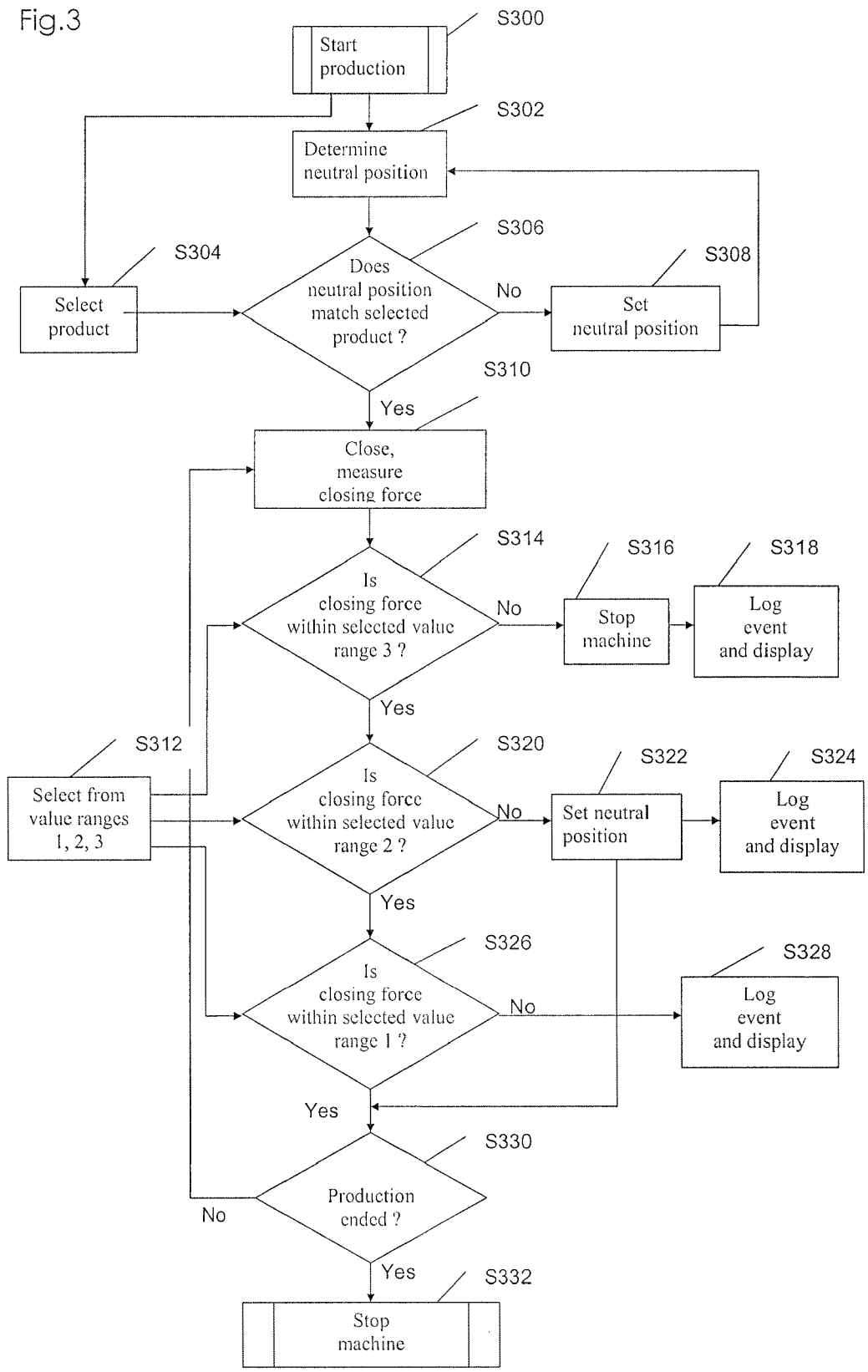
FIG. 3 shows a flow diagram of the closure operation and the method of the invention for adjusting the clip machine.

In the example of the method shown in FIG. 3, the value ranges are staggered in such a way that when first threshold values are exceeded or not reached, this is merely recorded and/or displayed, for example to indicate a potential source of error having impacts that are acceptable with respect to wear and tear on the clip machine and the durability of the closure produced. If the closing force exceeds or falls short of second threshold values, which generally span a larger value range, the neutral position is readjusted in order to bring the closing force back within an acceptable value range. Whether the adjustment made to the neutral position was sufficient or not is verified in the next closure cycle by measuring the closing force once again. In this way, a closed control loop is obtained. However, if the closing force lies outside a third, even wider value range, as will usually be the case when a malfunction occurs or when a serious error is made in operating the machine, the machine is immediately stopped so that the error can be remedied before damage occurs to production or even to the machine itself.

The flow diagram in FIG. 3 shows only one embodiment by way of example. The number of value ranges can be reduced or increased, thus permitting finer gradations. The value ranges can be partially or wholly identical. Instead of or in addition to the product selection performed in step S304, the value range or ranges can be selected on the basis of the neutral position determined in step S302. The adjustment method in steps S310 to S328 does not necessarily have to be integrated into the production process shown in FIG. 3. It is possible, in particular, to integrate various intermediate steps or sub-programs into the process as shown, especially before step S310 and/or after steps S326 and S328. Product selection pursuant to step S304 and verification pursuant to step S306 are to be understood as optional steps. Accordingly, the neutral position can be adjusted in step S308 and readjusted in step S322 either manually or automatically. For example, it can be specified that steps S302 to S308 for setting the neutral position are not performed after production starts, but instead after the product selection step, which depends on a starting signal being given.

Whereas the embodiment pursuant to FIG. 1 comprises an adjustable closing tool with a coupled device for measuring the closing force and a coupled position sensor, it is also possible for both closing tools to be adjustably configured and/or for separate measuring devices and position sensors to be provided, and for each of them to be assigned to different closing tools.

The invention claimed is:

1. A clip machine comprising:
    two closing tools movable relative to each other between an open position and a closed position for providing a closing force in order to close clips,
    adjusting means for setting a neutral position of one of said closing tools and defining a gap between the closing tools in the closed position;
    a spring coupled to said one closing tool, said spring acting against the closing force during clip closure;
    a measuring device comprising a position sensor connected to said one closing tool, said position sensor being configured to measure the deflection of the spring during clip closure as an indication of said closing force applied, and to output a measured value representing said closing force, and to output a value for a neutral position representative of the neutral position of said one closing tool.

2. The clip machine of claim 1, further comprising:
    an event data memory and a controller configured to compare the measured value with a first selected value range and to record the event in said event data memory if the measured value leaves said first selected value range.

3. The clip machine of claim 2, further comprising:
a servodrive coupled to the adjusting means, the controller being configured to compare the measured value with a second selected value range and to output a control signal for setting the neutral position at the servodrive if the measured value leaves the second selected value range.

4. The clip machine of claim 3, wherein the controller is configured to compare the measured value with a third selected value range and to stop the clip machine if the measured value leaves said third selected value range.

5. The clip machine of claim 4, wherein the controller includes a data memory and a selector for the value ranges.

6. The clip machine according to claim 5, wherein the selector is configured to select the first and/or second and/or third value range depending on the value for the neutral position.

7. The clip machine of claim 4 further comprising:
a display device configured to display the event if the measured value leaves the first and/or second and/or third selected value range.

8. The clip machine of claim 1 wherein the position sensor is configured to generate and output the value for the neutral position, said position sensor being configured to also generate and output a deflection value representing the deflection of the spring during clip closure.

9. The clip machine of claim 1 wherein the position sensor comprises a first part operably attached to said one closing tool and a second part attached to a fixed part of the clip machine.

* * * * *